US009619277B2

(12) United States Patent
Matsumoto

(10) Patent No.: US 9,619,277 B2
(45) Date of Patent: Apr. 11, 2017

(54) COMPUTER WITH PLURALITY OF PROCESSORS SHARING PROCESS QUEUE, AND PROCESS DISPATCH PROCESSING METHOD

(71) Applicant: HITACHI, LTD, Tokyo (JP)

(72) Inventor: Shuhei Matsumoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 513 days.

(21) Appl. No.: 14/170,861

(22) Filed: Feb. 3, 2014

(65) Prior Publication Data
US 2014/0298352 A1 Oct. 2, 2014

(30) Foreign Application Priority Data

Mar. 26, 2013 (JP) ................................. 2013-064808

(51) Int. Cl.
G06F 9/46 (2006.01)
G06F 9/48 (2006.01)
G06F 9/52 (2006.01)
(52) U.S. Cl.
CPC ............ G06F 9/461 (2013.01); G06F 9/4843 (2013.01); G06F 9/524 (2013.01); G06F 9/4806 (2013.01); G06F 9/4881 (2013.01)
(58) Field of Classification Search
CPC ...... G06F 9/461; G06F 9/4806; G06F 9/4843; G06F 9/485; G06F 9/4881; G06F 9/524
See application file for complete search history.

(56) References Cited

U.S. PATENT DOCUMENTS

| 4,318,182 | A | * | 3/1982 | Bachman | G06F 9/524 710/240 |
| 4,394,727 | A | * | 7/1983 | Hoffman | G06F 9/4881 718/103 |
| 5,485,626 | A | * | 1/1996 | Lawlor | G06F 9/4843 710/100 |
| 5,826,081 | A | * | 10/1998 | Zolnowsky | G06F 9/4843 718/102 |
| 5,884,077 | A | * | 3/1999 | Suzuki | G06F 9/5088 718/103 |
| 6,289,369 | B1 | * | 9/2001 | Sundaresan | G06F 9/505 718/100 |

(Continued)

OTHER PUBLICATIONS

Xu, Z., et al., Dynamic instrumentation of threaded applications, Proceedings of the seventh ACM SIGPLAN symposium on Principles and practice of parallel programming, 1999, 11 pages, [retrieved on Nov. 22, 2016], Retrieved from the Internet: <URL:http://dl.acm.org/>.*

(Continued)

Primary Examiner — Geoffrey St Leger
(74) Attorney, Agent, or Firm — Mattingly & Malur, PC

(57) ABSTRACT

A dispatcher stack is allocated to each of a plurality of processors sharing a run queue. Each processor, in process dispatch processing, saves in a switch-source process stack the context of a switch-source process (the process being run), saves in the dispatcher stack of each of the processors a dispatcher context, inserts the switch-source process into the run queue, removes a switch-destination process from the run queue, and, in addition, restores the context of the switch-destination process from the switch-destination process stack.

12 Claims, 15 Drawing Sheets

(56) References Cited

U.S. PATENT DOCUMENTS

| | | | | |
|---|---|---|---|---|
| 6,418,540 | B1* | 7/2002 | Dempsey | G06F 11/2028 712/228 |
| 6,675,191 | B1* | 1/2004 | Ito | G06F 9/461 710/260 |
| 6,728,959 | B1 | 4/2004 | Merkey | |
| 7,373,646 | B1* | 5/2008 | Smith | G06F 9/485 718/102 |
| 7,945,911 | B1* | 5/2011 | Garthwaite | G06F 9/4843 707/814 |
| 2004/0244003 | A1* | 12/2004 | Perfetto | G06F 9/4881 718/100 |
| 2006/0026406 | A1* | 2/2006 | Gardner | G06F 9/30043 712/228 |
| 2006/0150194 | A1* | 7/2006 | Xing | G06F 9/461 718/108 |
| 2007/0101326 | A1* | 5/2007 | Cai | G06F 9/545 718/100 |
| 2007/0136403 | A1* | 6/2007 | Kasuya | G06F 9/461 |
| 2008/0077926 | A1* | 3/2008 | Jeter | G06F 9/4881 718/102 |
| 2013/0247057 | A1* | 9/2013 | Fujimori | G06F 9/4806 718/102 |

OTHER PUBLICATIONS

Farkas, K., et al., The multicluster architecture: reducing cycle time through partitioning, Proceedings of the 30th annual ACM/IEEE international symposium on Microarchitecture, 1997, 11 pages, [retrieved on Nov. 22, 2016], Retrieved from the Internet: <URL:http://dl.acm.org/>.*

Acosta, R., et al., An Instruction Issuing Approach to Enhancing Performance in Multiple Functional Unit Processors, IEEE Transactions on Computers, vol. C-35, Issue: 9, Sep. 1986, 14 pages, [retrieved on Nov. 22, 2016], Retrieved from the Internet: <URL:http://ieeexplore.ieee.org/>.*

Vahalia, U., "Traditional UNIX Scheduling", UNIX Internals: The New Frontiers, 1995, pp. 117 to 121, Chapter 5, section 5.4, Prentice Hall.

* cited by examiner

FIG. 14
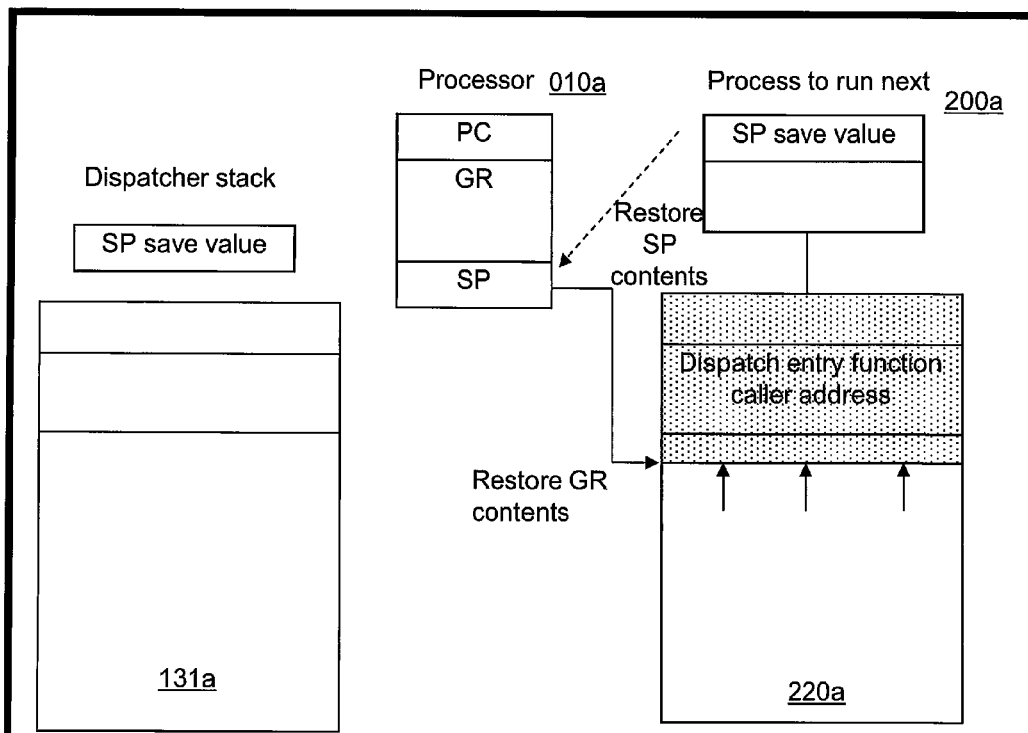
(S1107) Immediately after restoring context of process to run next
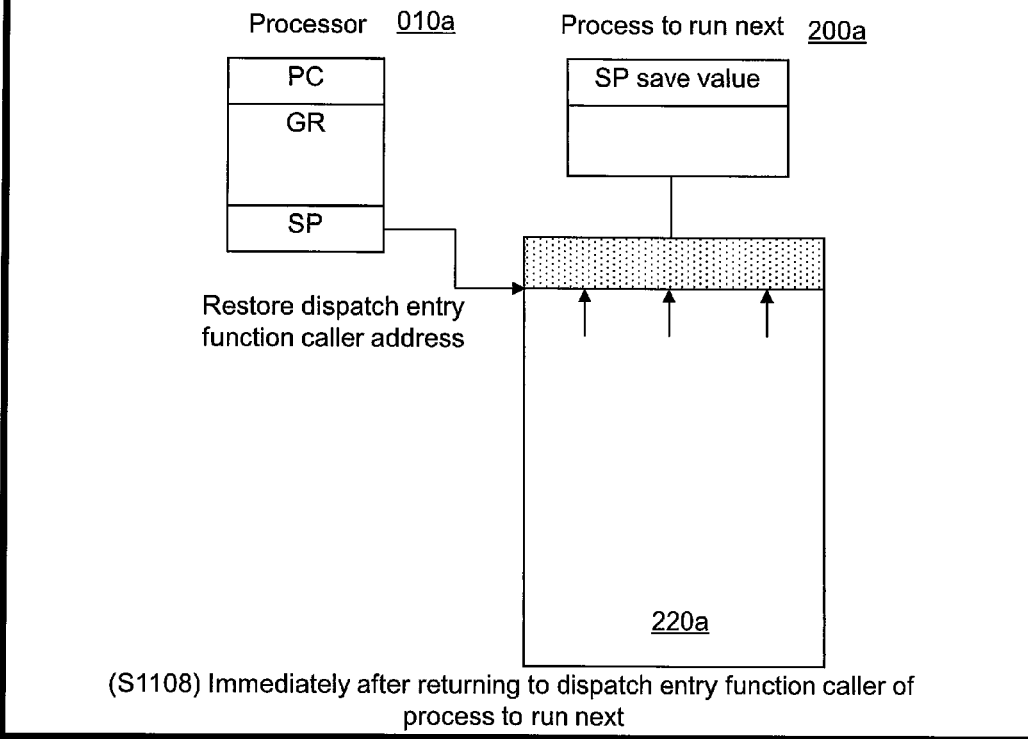
(S1108) Immediately after returning to dispatch entry function caller of process to run next

COMPUTER WITH PLURALITY OF PROCESSORS SHARING PROCESS QUEUE, AND PROCESS DISPATCH PROCESSING METHOD

CROSS-REFERENCE TO PRIOR APPLICATION

This application relates to and claims the benefit of priority from Japanese Patent Application number 2013-064808, filed on Mar. 26, 2013, the entire disclosure of which is incorporated herein by reference.

BACKGROUND

The present invention generally relates to process dispatch processing.

In a computer, an operating system scheduler plays the role of carrying out time sharing of processor resources among a plurality of processes. An operating system has a scheduler, and a run queue is the basic data structure used in process scheduling. The run queue is a queue for keeping processes that are ready to run on a processor.

Among the scheduling processes of the scheduler, a process for switching the process to be run on the processor is specifically called a process dispatch process. The component of the operating system in charge of the process dispatch process is specifically called a dispatcher.

The dispatcher is called when switching the process to be run on the processor. When the dispatcher is called, the dispatch process is run. The dispatcher inserts the current process into the run queue, removes the process with the highest priority from within the run queue, and runs the removed process on the processor.

The run queue has two modes. One is a local run queue that provides an individual run queue for each processor. The other is a shared run queue that shares a single run queue with a plurality of processors. A shared run queue that is shared by all of the processors in a computer is specifically called a global run queue.

In general, the operating system mainly uses the local run queue. When using the local run queue, process scheduling operates independently among a plurality of processors. Therefore, there is no competition among the plurality of processors, making it possible to achieve high scalability relative to the number of processors. Since a process is bind to a single processor, the cache efficiency effect is also great when each processor has a separate cache.

However, in recent years, a multi-core processor in which a plurality of processor cores is mounted in a single socket has become the standard. In a multi-core processor, a large-capacity cache is generally provided in each socket, enabling the adoption of a structure in which a plurality of processors inside the socket shares the large-capacity cache. Therefore, to make each process remain in a socket is adequate for cache efficiency.

Also, in a computer, load balance among processors and rate control of resource allocation among processors are both important. When the local run queue is used, process scheduling is performed independently among the processors, and the load is not shared among the processors. Therefore, the scheduler must detect load bias among the processors and unbalanced resource allocation among virtual computers on its own, and dynamically make adjustments by explicitly migrating processes among the processors.

However, the adjustments are complex and difficult, and the processing cost is high. Complexity and costs have increased in line with increases in the number of processors.

In response to these problems, when a shared run queue is provided in units of processor sockets and sharing is performed by the processors in the socket, cache efficiency can reach practically the same level as that of the local run queue. In addition, since the load is shared by the processors inside the socket, the socket can be regarded as one big processor, and inter-processor load balancing and rate control for inter-processor resource allocation can be performed naturally without explicitly migrating processes among the processors.

When the shared run queue is used, an effect whereby cache efficiency is practically on a par with that of the local run queue, and load balancing and/or rate control is simplified can be expected.

However, as disclosed in the section 5.4 entitled Traditional UNIX Scheduling on pages 117 to 121 in *UNIX Internals: The New Frontiers* by U. Vahalia, Prentice Hall, in a widely-known conventional dispatch processing method, the expected effect cannot be achieved due to the likelihood of deadlock occurring and a lack of adequate solutions therefor.

U.S. Pat. No. 6,728,959 discloses a method for reducing the overhead of competition for access to a shared run queue in process dispatch processing when a shared run queue is used. In U.S. Pat. No. 6,728,959, a shared run queue shared by a plurality of processors and a local run queue for each processor are provided, and in process dispatch processing, the local run queue is accessed as much as possible, thereby reducing accesses to the shared run queue.

However, U.S. Pat. No. 6,728,959 does not propose a method for directly improving process dispatch processing when using the shared run queue.

SUMMARY

A dispatcher does not possess its own stack. However, a stack is essential for running a program. Consequently, the dispatcher runs by sharing a stack with the currently running process that called it itself and the process to run next. Then, when the dispatcher is running, so as not to break up the stack, a context save of the currently running process and a context restore of the process to run next are executed as a series of processes called a context switch.

In order to execute the context switch, it is necessary to decide the process to run next. Therefore, the insertion of the currently running process into the run queue and the fetching of the process to run next from the run queue must be performed prior to switching the context from the currently running process to the process to run next.

When the run queue is a shared run queue and the shared run queue is shared by a plurality of processors, there is a likelihood of deadlock occurring in the dispatch process. Deadlock refers to a state in which two or more processors wait for the processing of a processor other than themselves to end, with the end result that the two or more processors cannot advance beyond any of the other processors.

Specifically, the dispatcher, on a certain processor, inserts the current process that called it itself into the shared run queue before saving the process context. Therefore, a dispatcher running on a different processor can select the process as the process to run next before process context save is complete. Consequently, when the dispatcher has selected a certain process as the process to run next, there are cases in which the context save for the selected process has not been completed. In this case, the dispatcher is made to wait until the context save for the selected process is complete. The dispatcher executes the context save of the current process and the context restore of the next process as a coherent single process called a context switch. Therefore, the dispatcher is made to wait until the context save of the process to run next is complete before restoring the context of the process to run next and saving the context of the process currently being run. When waiting for the context save of this process cycles among a plurality of processors, deadlock occurs.

A stack for use by the dispatcher is allocated to each of the plurality of processors sharing the run queue. Each processor, in the process dispatch processing, saves the context of the switch-source process (the process being run) to the switch-source process stack, saves the dispatcher context to the dispatcher stack of its own processor, inserts the switch-source process into the run queue, removes the switch-destination process from the run queue, and, in addition, restores the context of the switch-destination process from the switch-destination process stack.

Even when each processor, prior to releasing a held stack, acquires another stack not held by any other processor and releases the held stack thereafter, for the switching of the context of the switch-source process running up to that point the saving of the switch-source process inside the stack is guaranteed to be complete prior to selecting the switch-destination process. Therefore, the processor is able to acquire the stack for the switch-destination process after releasing the stack for the switch-source process, and consequently, deadlock does not occur in the dispatch processing of the plurality of processors sharing the run queue.

BRIEF DESCRIPTION OF THE DRAWINGS

FIG. 14 is a final portion of the conceptual drawing showing the flow of dispatch processing related to the embodiment.

DETAILED DESCRIPTION OF THE EMBODIMENT

An embodiment of the present invention will be explained in detail using the drawings.

In the following embodiment, two processors share a run queue (shared run queue), but more than two processors may share the run queue.

In the following explanation, when giving an explanation that makes a distinction between same-type elements, a reference sign that is a combination of a parent symbol and a child symbol (for example, processor 0 (010*a*)) will be used, and when giving an explanation that does not make a distinction between same-type elements, only the parent symbol (for example, processor 010) will be used.

Furthermore, in the following explanation, there are cases in which a program, a process, or a function is used as the subject of a sentence explaining the processing, but the program, process, or function is actually being performed by the processor, and as such, the processor can be regarded as the subject of the sentence about the processing.

Figure 1:
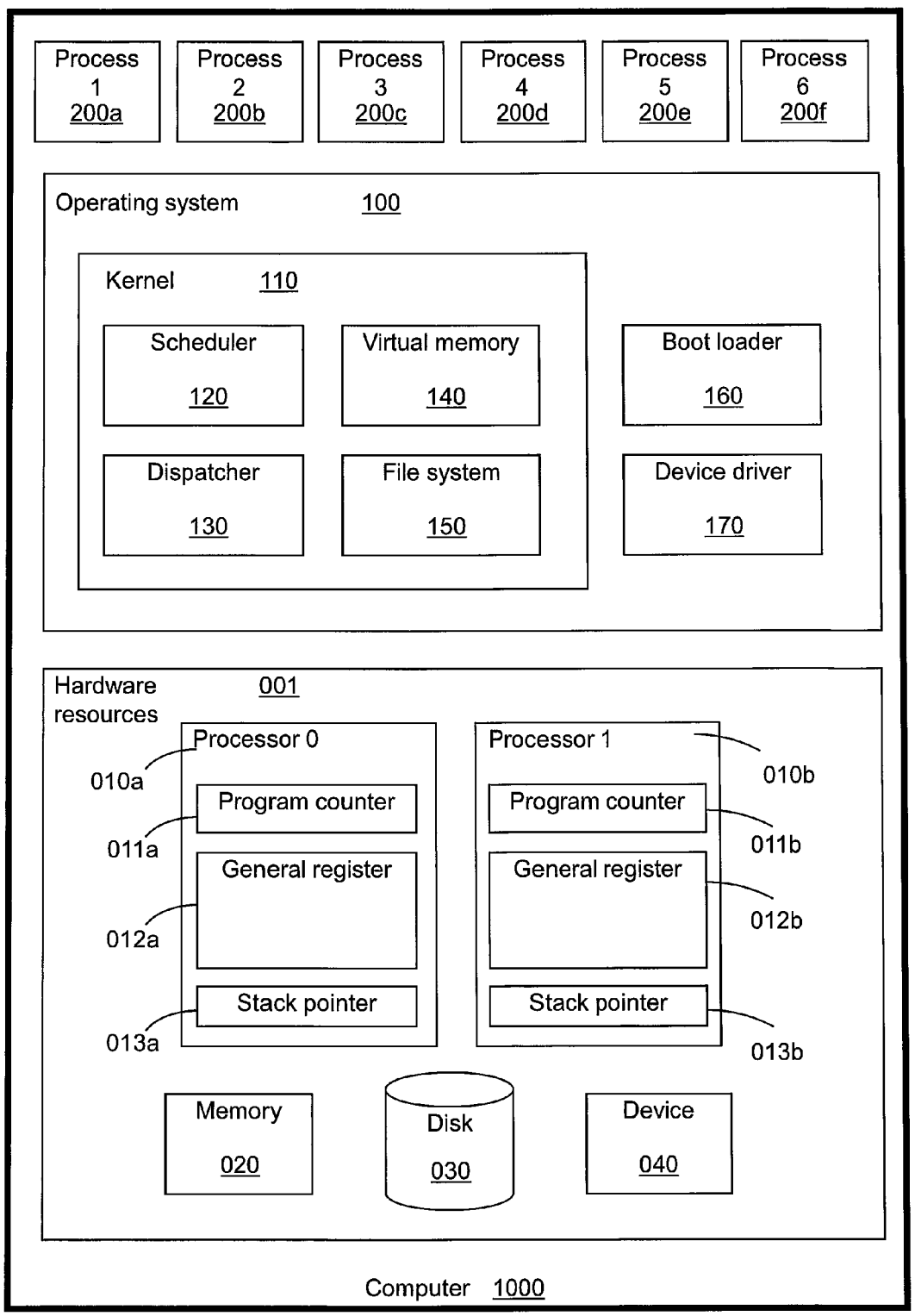
FIG. 1 is a block diagram showing an overview of a computer related to an embodiment.

FIG. 1 is a block diagram showing an overview of a computer related to an embodiment of the present invention.

The hardware resources 001 of a computer 1000 include two processors, processor 0 (010*a*) and processor 1 (010*b*), that share a run queue. The hardware resources 001 also include a memory 020, a disk 030, and various other devices 040. The processor 0 (010*a*) and the processor 1 (010*b*) are communicably connected to the memory 020, the disk 030, and the devices 040.

The processors 010 have hardware resources for executing a program. Specifically, for example, the hardware resources of the processor 0 (010*a*) include a program counter (PC) 011*a*, a general register (GR) 012*a*, and a stack pointer (SP) 013*a*. The processor 1 (010*b*) has identical hardware resources 011*b*, 012*b*, and 013*b*. The program counter 011 is a register indicating the address in memory where an instruction to run next is stored. The general register 012 is not limited to a specific function, and is used for multiple purposes, and, for example, is used for temporarily storing data, instructions, memory addresses where data has been stored, and operation results. The stack pointer 013 is a register (information) indicating the last-referenced location inside a stack, and is used for saving data to the stack and fetching data from the stack. As used here, the stack is a data structure of a last-in-first-out memory, and is used for passing an argument in a function call, saving the caller address of a function, and temporarily saving a variable for executing a function. The processor 010 may have other hardware resources (for example, a plurality of levels of cache, and the like).

The memory 020 is a volatile memory for storing programs and data, but may be a different type of memory.

The disk 030 is a nonvolatile disk-type storage device (for example, a hard disk drive) for storing programs and data, but may be a different type of storage device.

The devices 040 include a communication interface for the computer 1000 to communicate with an external computer over an external communication network, an expansion card for connecting to an external disk, and a timer that causes an interrupt in the processor 0 (010a) and the processor 1 (010b) at a specified time point, but since such details are of no concern in the embodiment, the devices will simply be referred to collectively as the device 040.

An operating system (OS) 100 is stored in the memory 020, and a process 200 is run in accordance with the OS 100 being run by the processor 010. Specifically, the OS 100 manages the hardware resources 001, and provides a shared service to a process 1 (200a) to process 6 (200f). The OS 100 plays the role of an arbitration between the hardware resources 001 and from the process 1 (200a) to the process 6 (200f). The OS 100 has a kernel 110, a boot loader 160, and a device driver 170.

The kernel 110 is the part constituting the core of the OS 100, and provides the basic functions of the operating system, such as monitoring the processes 200 and peripheral devices, managing the hardware resources 001, such as the processors 010 and the memory 020, processing interrupts, and inter-process communications.

The boot loader 160 operates immediately after the computer has booted up, and provides functions for reading the OS 100 into the memory 020 from the disk 030 and booting up the OS 100.

The device driver 170 provides functions for controlling the expansion card and a peripheral device and other such input/output devices.

The kernel 110 has a scheduler 120, a dispatcher 130, a virtual memory 140, and a file system 150.

The scheduler 120 plays the role of deciding the run sequence of processes 200 for the time sharing of a processor 010 by a plurality of processes 200, and is regularly called to decide which process 200, from among a plurality of processes 200, to allocated to the processor 010 next. This function is specifically called "scheduling".

The dispatcher 130 switches the process 200 to be run on the processor 101 for the time sharing of the processor 010 by a plurality of processes 200. This function is specifically called "dispatch". There may be instances where the scheduler and the dispatcher are collectively called the "scheduler". Specifically, the scheduler 120 may include the functions of the dispatcher 130.

The virtual memory 140 makes use of memory management for allocating a portion of the memory 020 in accordance with a process 200 request and releasing the memory 020 for reuse when no longer required for the allocated process 200, and virtual address management for making a non-contiguous memory area appear to be contiguous to the process 200, and provides a function that makes possible the virtual use of a memory capacity that is larger than the capacity of the memory 020.

The file system 150 mainly provides functions for managing various data recorded in the disk 030 and so forth as files. A process 200 is able to access various data via the file system 150 using a standardized form.

The processes 200 (200a through 200f) are execution environments for applications and other such programs, and are provided by the kernel 110.

Figure 2:
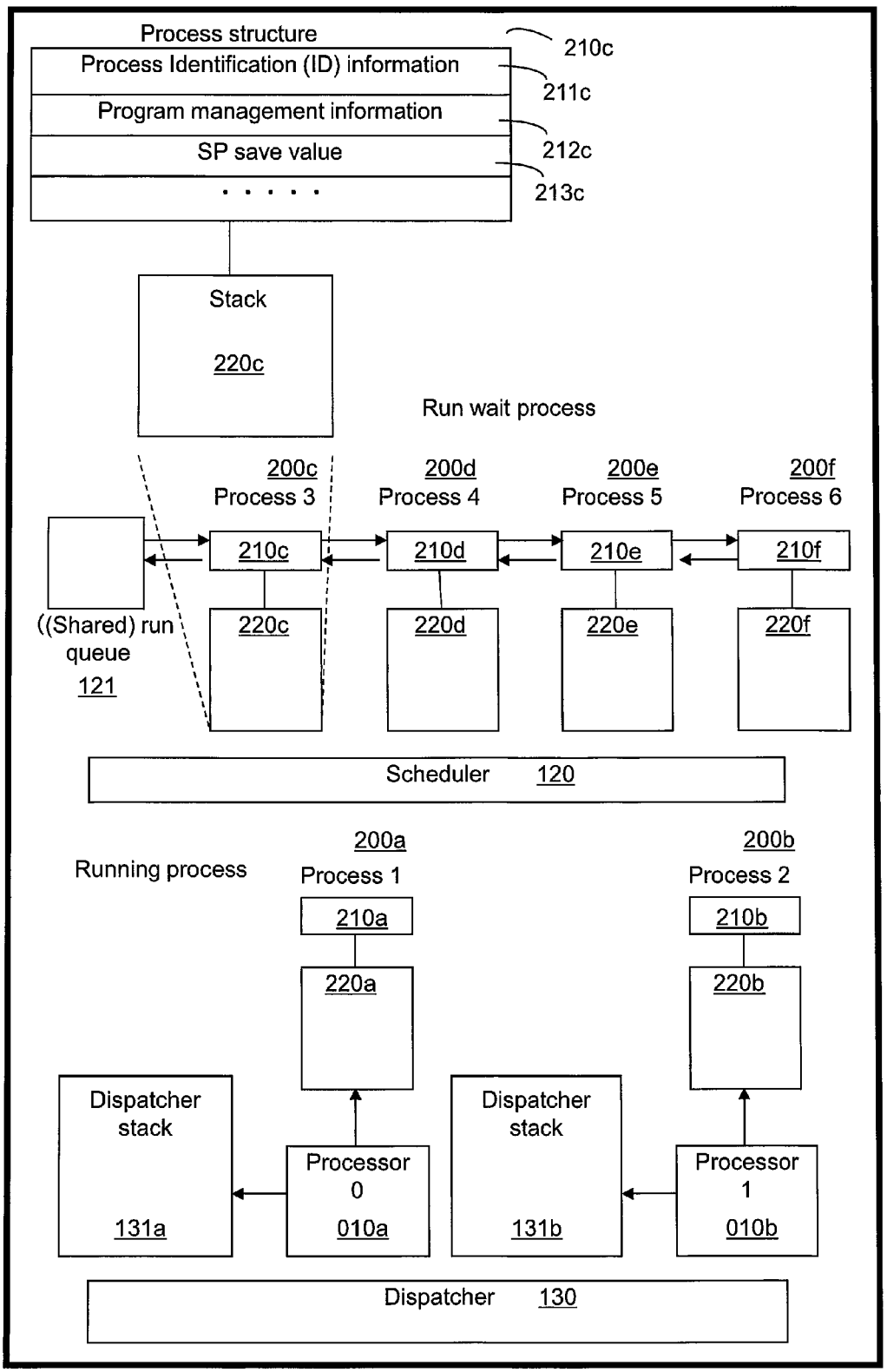
FIG. 2 is a schematic diagram of scheduling and dispatch related to the embodiment.

FIG. 2 is a schematic diagram of scheduling and dispatch related to the embodiment.

A process 3 (200c) holds a process structure 210c and a stack 220c in the memory 020. The process structure 210c is a data structure for holding process information required for the kernel 110, and comprises process identification (ID) information 211c, process management information 212c, and a stack pointer value 213c. The stack 220c is used for saving the caller address of a function, holding the local variable of the function, and saving the contents of the general register at process switching. The same holds true for process 1 (200a), process 2 (200b), process 4 (200d), process 5 (200e), and process 6 (200f).

When process 1 (200a) and process 2 (200b) are running on the processor 0 (010a) and the processor 1 (010b), respectively, process 3 (200c), process 4 (200d), process 5 (200e), and process 6 (200f) are in a waiting state. The scheduler 120 uses a run queue 121 to manage the processes that are in the run waiting state. The run queue 121 is shared by processor 0 (010a) and processor 1 (010b). That is, the run queue 121 is the shared run queue of the two modes of local run queue and shared run queue. The run queue 121, for example, is managed by using the memory 020.

The run queue 121 is a queue, and the scheduler 120 controls the order in which the processes 200 are sorted inside the run queue. There are a variety of methods for sorting the processes 200 in the run queue 121, such as last-in-first-out and priority order, but such details are of no concern in the embodiment.

In the embodiment, a dispatcher stack 131a and a dispatcher stack 131b are respectively allocated to the processor 0 (010a) and the processor 1 (010b). Using stacks 131 like this changes dispatch processing and solves the problem of deadlock when using the shared run queue 121, with no lock contention being caused among a plurality of processors 010, thereby making it possible to achieve the anticipated effects of the shared run queue 121.

First, the necessity for the stack 131a and the stack 131b will be described. The register contents (the information recorded in the register) of a processor 010 when processes 200 are running on the processor 010 will be called "context" in the embodiment. In the embodiment, the context of a process 200 includes a general register and a stack pointer. When the running of a certain process 200 on a processor 010 is temporarily halted for time sharing the processor 010 with a plurality of processes, the context of the process 200 must be saved, and when the process 200 resumes running, the context of the process 200 must be restored. The context save and restore of the process 200 is performed using the process structure and the stack of the process 200.

Figure 3:
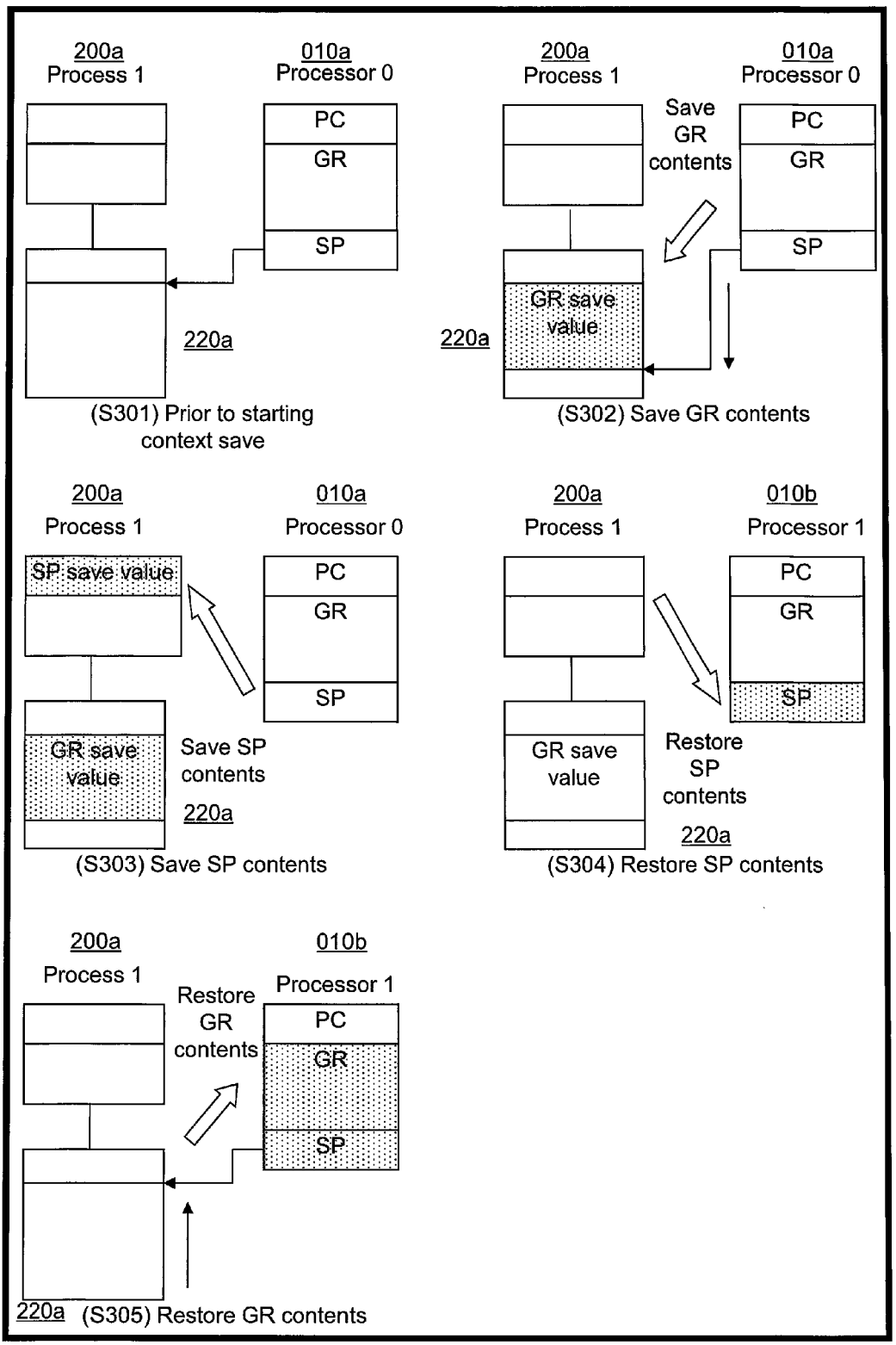
FIG. 3 is a conceptual drawing showing the flow of processing for saving and restoring process context.

FIG. 3 is a conceptual drawing showing the flow of processing for saving and restoring process context. Process context save and restore will be explained hereinbelow by giving as an example a case in which the process 1 (200a), which was running on the processor 0 (010a), temporarily halts running on the processor 0 (010a) and resumes running on the processor 1 (010b).

S301: This is the state prior to starting a context save.

S302: In the context save of process 1 (200a), first, the processor 0 (010a) saves the contents of the general register 012 of the processor 0 (010a) in the process 1 (200a) stack 220a.

S303: Next, the processor 0 (010a) saves the contents of the processor 0 (010a) stack pointer 013a to the process structure 210a of the process 1 (200a).

S304: In the context restore of the process 1 (200a), first the processor 1 (010b) restores the contents of the stack pointer 013a from the process structure 210a of the process 1 (200a) to the stack pointer 013b of the processor 1 (010b).

S305: Next, the processor 1 (010b) restores the contents of the general register from the process 2 (200b) stack 220b to the general register 012b of the processor 1 (010b).

As described hereinabove, the process for switching the process to be run on the processor is called the "dispatch process". The dispatch process is run by the dispatcher 130 in accordance with a process calling the dispatch process. The dispatcher 130 must select the process to run next, and the dispatcher 130 does this by removing the first process from the shared run queue 121 in which the order of the processes is controlled by the scheduler 120. The process currently running is included among the candidates for the process to run next, and as such, the dispatcher 130 first inserts the currently running process in the shared run queue 121, and removes the process to run next from the shared run queue 121 thereafter.

The dispatcher 130 does not have its own stack. However, a stack is essential for running a program. Therefore, the dispatcher 130 runs by sharing the stack with the currently running process that called it itself and the process to run next. Then, when the dispatcher 130 is running, so as not to break up the stack, a context save of the currently running process and a context restore of the process to run next are executed as a series of processes called a context switch.

In order to execute the context switch, it is necessary to decide the process to run next. Accordingly, when the insertion of the currently running process 200 into the run queue 121 and the removing of the process 200 to run next from the shared run queue 121 are performed prior to switching the context from the currently running process 200 to the process 200 to run next, there is the likelihood of deadlock occurring as was described hereinabove.

This consideration (a comparative example of the embodiment) will be explained below by referring to FIGS. 4 through 9.

Figure 4:
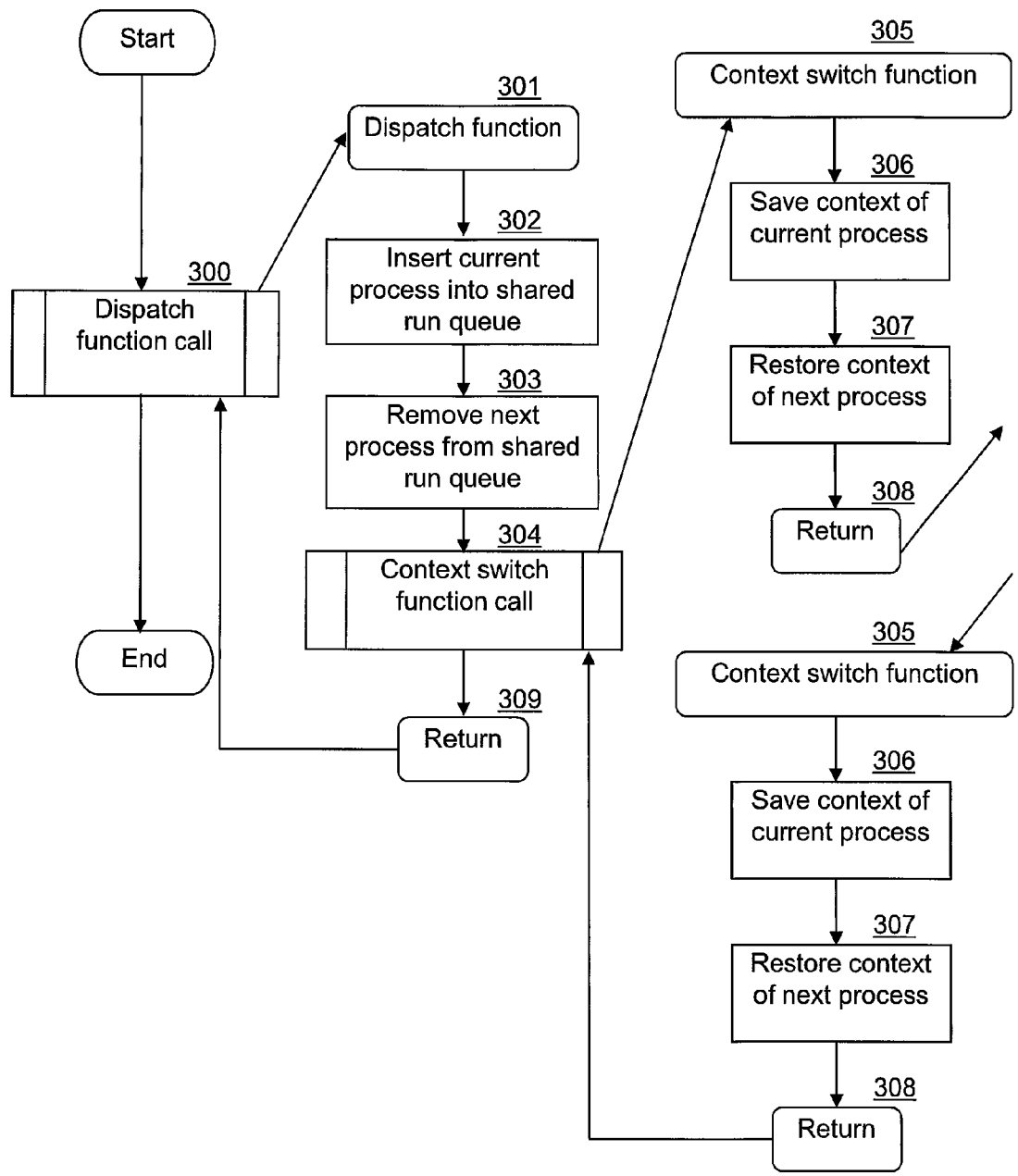
FIG. 4 is the flow of execution of dispatch processing related to a comparative example of the embodiment.

FIG. 4 represents the flow of execution of a dispatch process related to a comparative example. FIGS. 5 through 8 show the flow of dispatch processing related to the comparative example.

Figure 5:
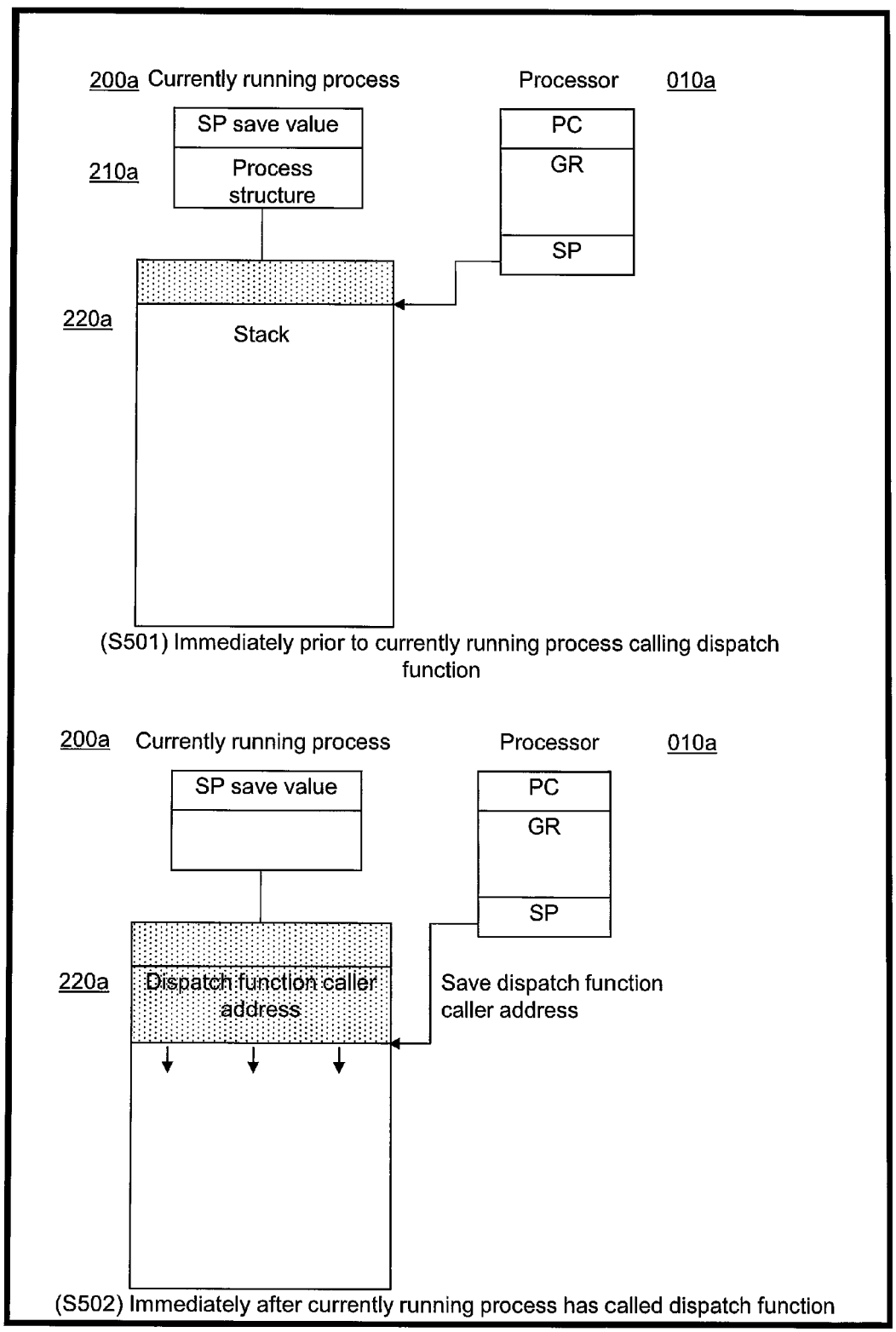
FIG. 5 is a first portion of a conceptual drawing showing the flow of dispatch processing related to a comparative example of the embodiment.

S501 in FIG. 5: This represents the state prior to the process 200a currently running on the processor 010a calling the dispatch function.

S502 in FIG. 5: When the process 200a calls the dispatch function 301 (300 in FIG. 4), the caller address of the dispatch function 301 is saved to the stack of the process 200a. The dispatch function 301, when called, first inserts the current process 200a into the run queue 121 (302 in FIG. 4). The insertion location is decided by the scheduler 120. The dispatch function 301 fetches the process to run next from the run queue 121. Then, the dispatch function 301 calls the context switch function 305 (304 in FIG. 4).

Figure 6:
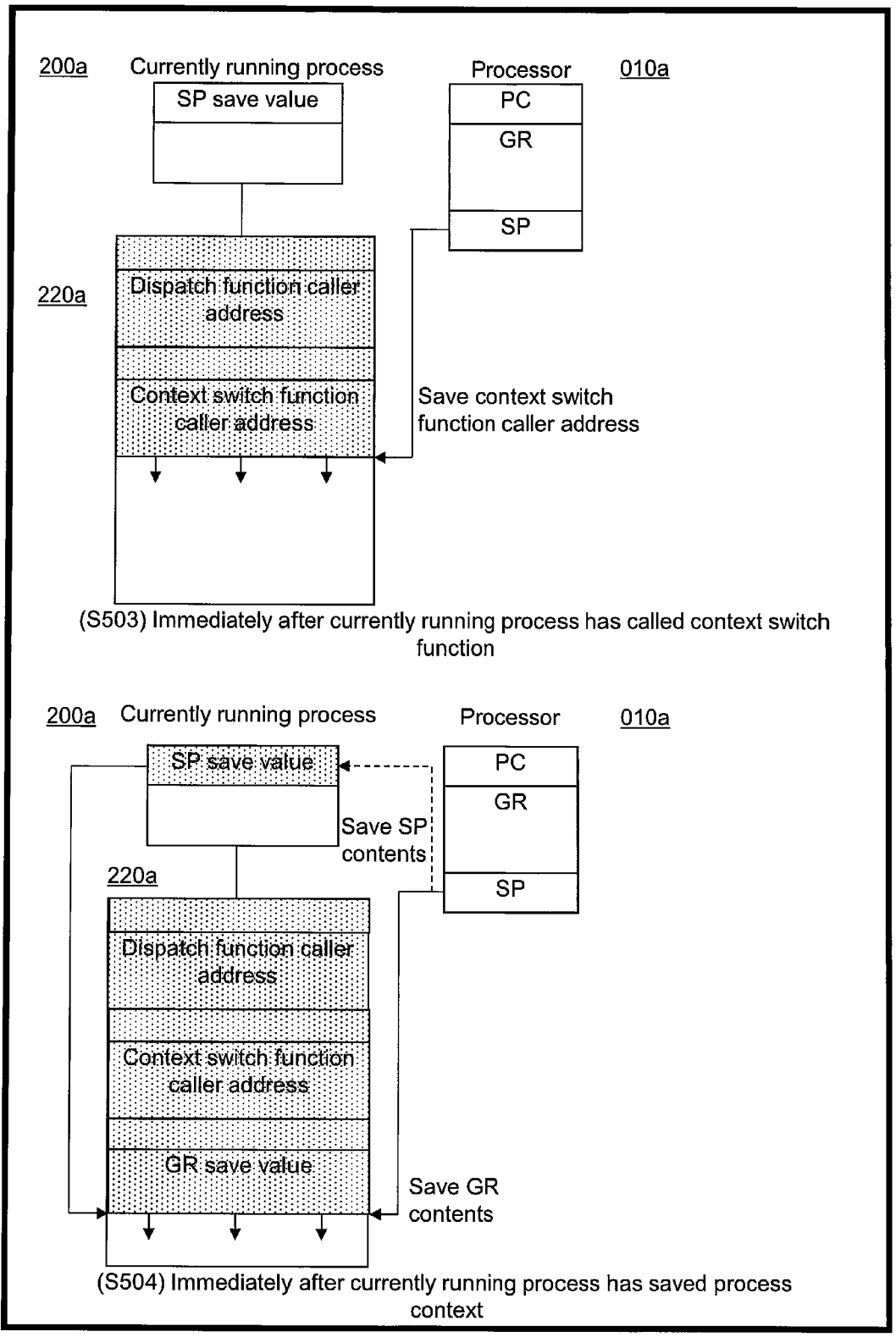
FIG. 6 is a second portion of the conceptual drawing showing the flow of dispatch processing related to the comparative example of the embodiment.

S503 in FIG. 6: When the context switch function 305 is called, the caller address of the context switch function 305 is saved to the stack 220a of the current process 200a.

S504 in FIG. 6: The context switch function 305 performs a context save as described hereinabove.

After that, a context restore for the process to run next is performed.

Figure 7:
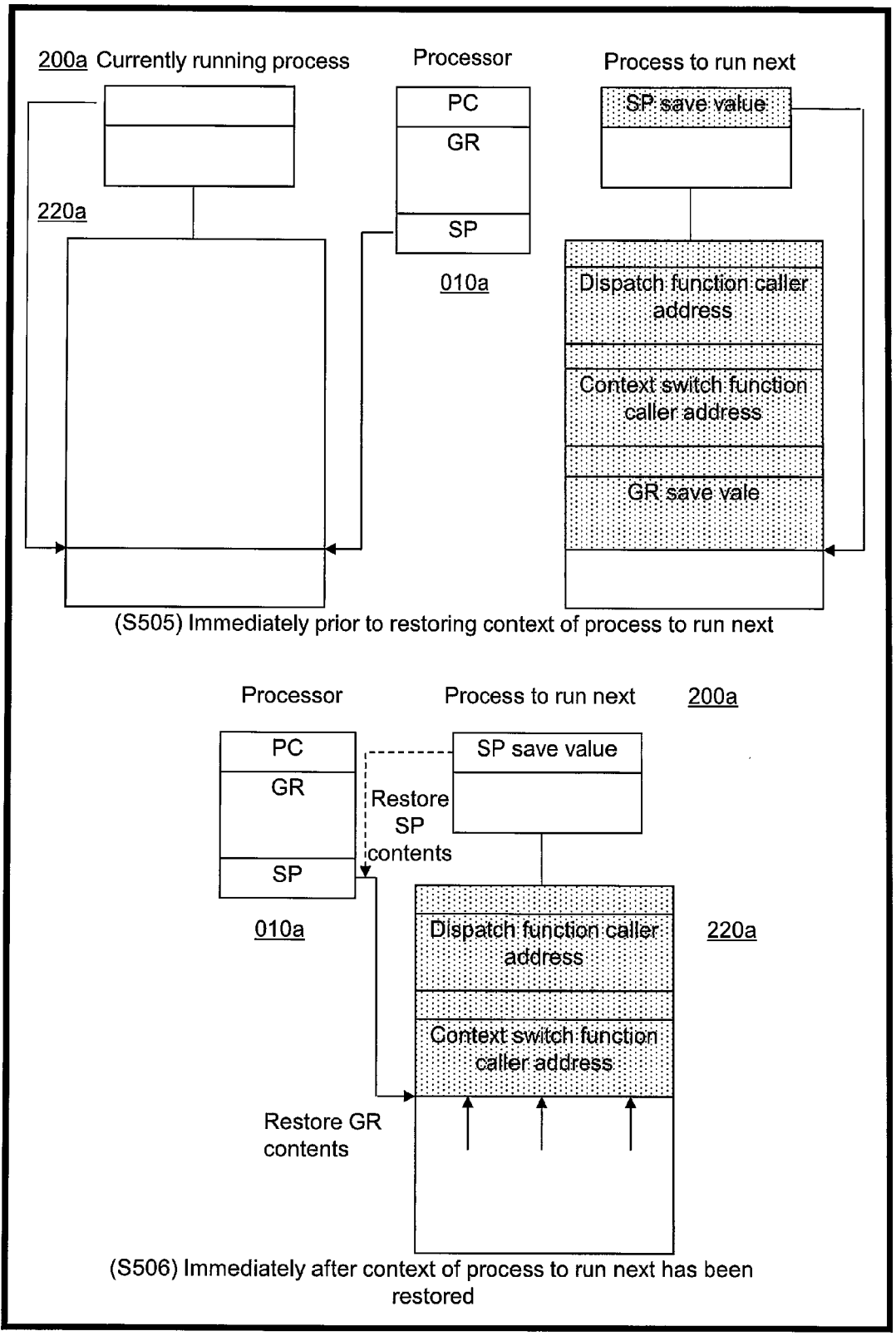
FIG. 7 is a third portion of the conceptual drawing showing the flow of dispatch processing related to the comparative example of the embodiment.

S505 in FIG. 7: That is, the process 200a becomes the process to run next, and the context switch function 305 starts the context restore for this process 200a. In the context restore (307 in FIG. 4), the context switch function 305 switches the stack used by the processor 010a to the stack 220a of the next process 200a by restoring the stack pointer contents 213a saved in the process structure 210a of the process 200a to the stack pointer 013a of the processor 010a.

S506 in FIG. 7: After that, as described hereinabove, the context switch function 305 restores the process 200a context to the processor 010a.

Figure 8:
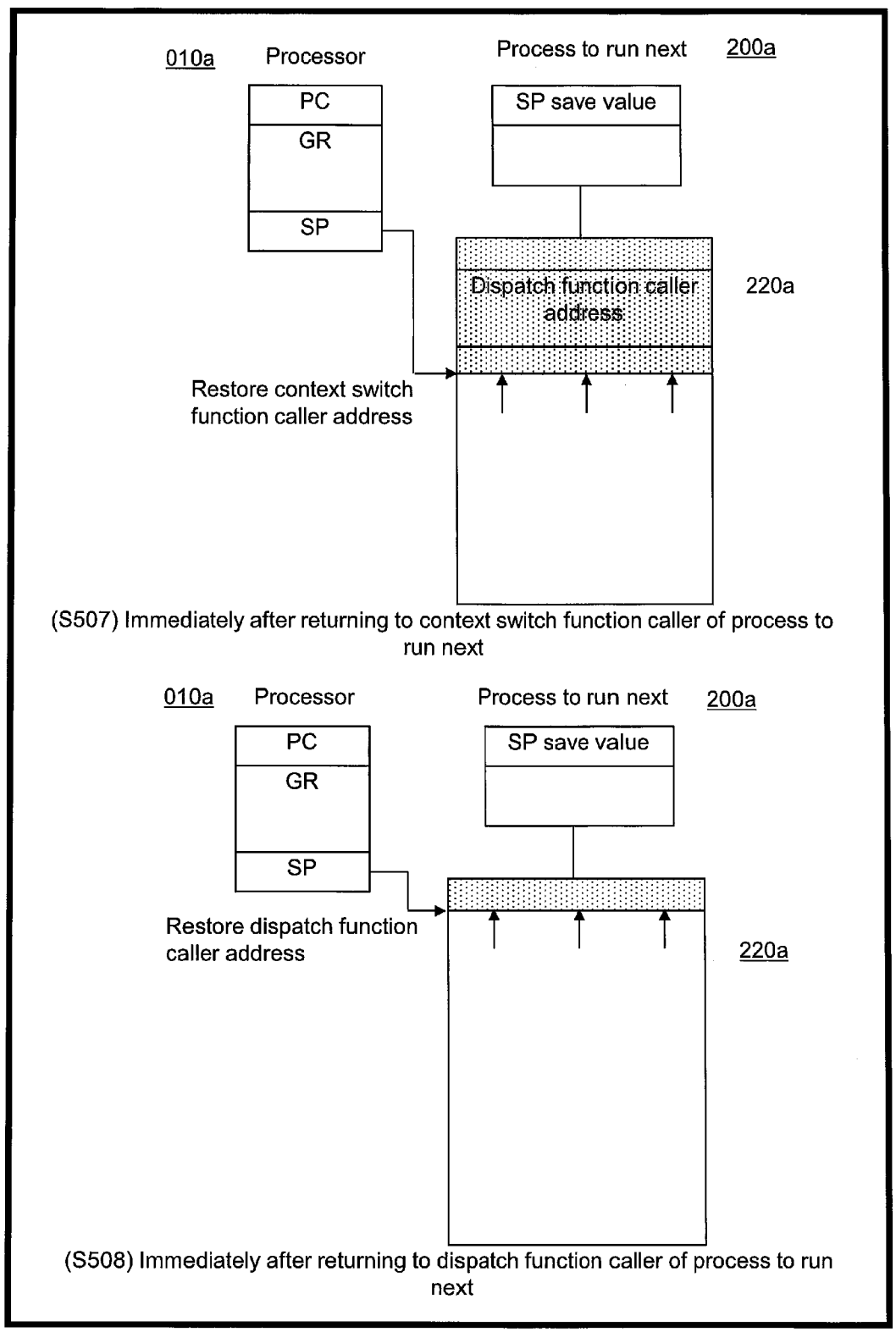
FIG. 8 is a final portion of the conceptual drawing showing the flow of dispatch processing related to the comparative example of the embodiment.

S507 in FIG. 8: The processor 010a ends the context switch function 305 (308 in FIG. 4), and returns to the context switch function 305 caller saved in the stack 220a of the next process 200a.

S508 in FIG. 8: In addition, the processor 010a returns to the caller of the dispatch function 301 saved in the stack 220a of the next process 200a (309 in FIG. 4), and resumes running the next process.

According to this comparative example, there is a likelihood of deadlock occurring in the dispatch process.

Figure 9:
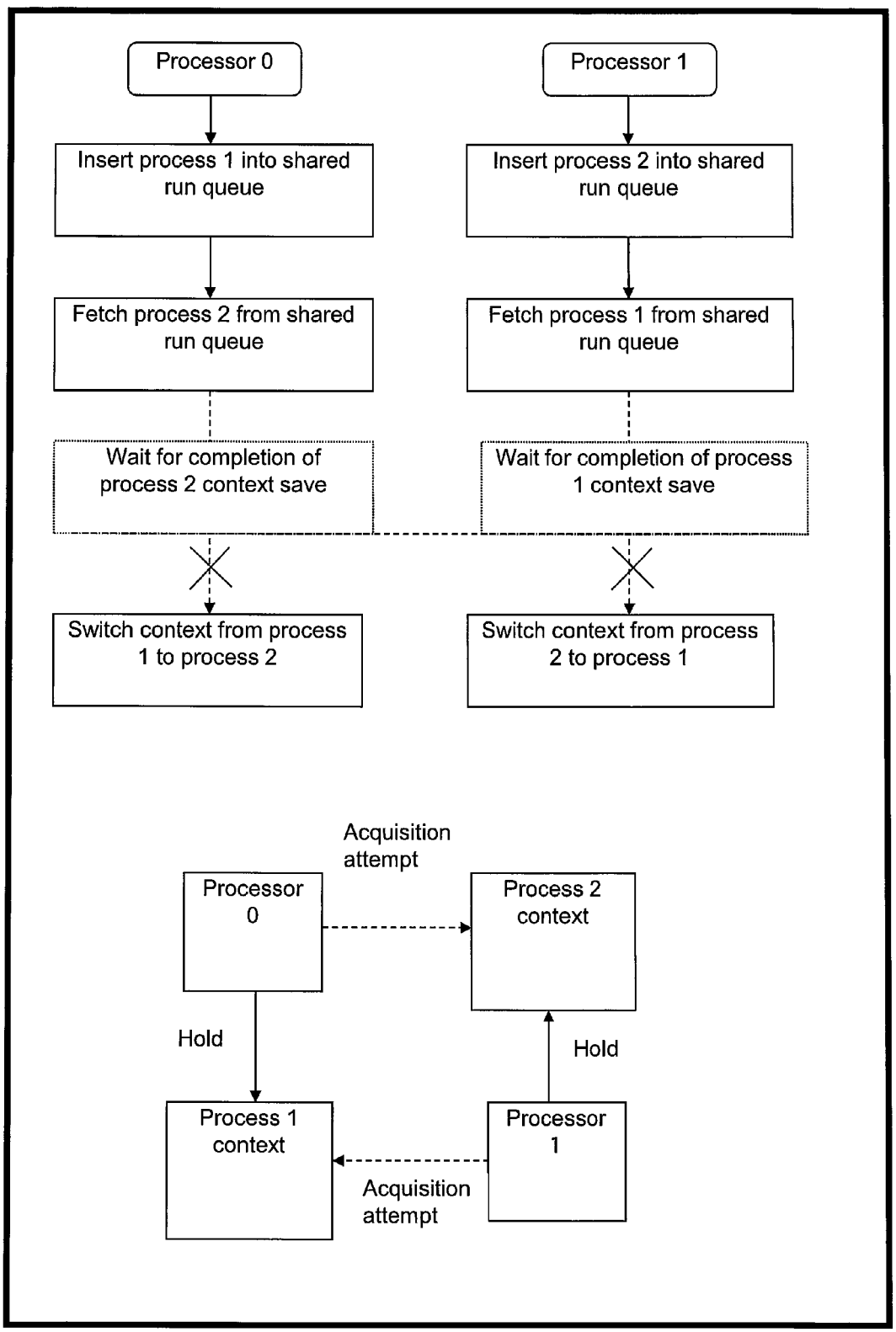
FIG. 9 is a conceptual drawing showing the likelihood of deadlock occurring in the dispatch process related to the comparative example of the embodiment.

That is, as shown in the upper part of FIG. 9, when the process 1 (200a) currently running on the processor 0 (010a) calls the dispatcher 130, the dispatcher 130 inserts the process 1 (200a) into the shared run queue 121. Meanwhile, when the process 2 (200b) currently running on the processor 1 (010b) calls the dispatcher 130, the dispatcher 130 inserts the process 2 (200b) into the shared run queue 121.

The scheduler 120, upon the process 1 (200a) and the process 2 (200b) being inserted into the shared run queue 121, arranges the process 2 (200b) at the head and arranges the process 1 (200a) next thereto.

When the dispatcher 130 fetches the process at the head of the shared run queue 121 on the processor 0 (010a), the process 2 (200b) is fetched. Next, when the dispatcher 130 fetches the process at the head of the shared run queue 121 on the processor 0 (010a), the process 1 (200a) is fetched. In order to switch the context from the process 1 (200a) to the process 2 (200b) on the processor 0 (010a), the dispatcher 130 waits for the context save for the process 2 (200b) to be completed. In order to switch the context from the process 2 (200b) to the process 1 (200a) on the processor 1 (010b), the dispatcher 130 waits for the context save for the process 1 (200a) to be completed.

The process 1 (200a) context save is performed during the context switch from the process 1 (200a) to the process 2 (200b), and the process 2 (200b) context save is performed during the context switch from the process 2 (200b) to the process 1 (200a). Therefore, the processor 0 (010a) cannot wait for the completion of the process 2 (200b) context saving to start the process 1 (200a) context save, and the processor 1 (010b) cannot wait for the completion of the process 1 (200a) context saving to start the process 2 (200b) context save. This causes deadlock to occur.

The reason the deadlock occurs will be explained in further detail. In the comparative example, on the processor 0 (010a), the dispatcher 130 inserts the current process 1 (200a), which called it itself, into the shared run queue 121 before saving the context of the process 1 (200a). Thus, the dispatcher 130 currently running on the processor 1 (010b) can select the process 1 (200a) as the process to run next before the context save for the process 1 (200a) has been completed. Consequently, when the dispatcher 130 selects a certain process as the process to run next, there may be a case in which the context save for the selected process is not complete. In this case, the dispatcher 130 is made to wait until the context save for the selected process has been completed. In addition, the dispatcher 130 executes the current process context save and the next process context restore as a single coherent process called a context switch. Thus, the context restore for the process to run next and the context save for the process that is currently running are made to wait until the context save for the process to run next is complete. When this waiting for the process context save cycles among a plurality of processors, deadlock occurs.

Deadlock can be explained as follows when the process context is thought of as a resource to be shared by a plurality of processors, a process context restore is regarded as a process context acquire by the processors, and a process context save is regarded as a process context release by the processors. That is, as shown in the bottom part of FIG. 9, the processor 0 (010*a*) attempts to acquire the process 2 (200*b*) context while holding the process 1 (200*a*) context as-is, and the processor 1 (010*b*) attempts to acquire the process 1 (200*a*) context while holding the process 2 (200*b*) context as-is, thereby causing a deadlock.

In order to avoid such a deadlock, a method for protecting the entire dispatch process with a lock is conceivable, but this method is inadequate as the overhead resulting from the competition between the process context save and restore would be enormous.

Accordingly, in the embodiment, a dispatcher stack 131 is provided for each processor 010 sharing the shared run queue 121, and each processor 010 can avoid deadlock without generating overhead due to inter-processor competition by using the dispatcher stack 131 that has been allocated to itself to perform process context save and restore. Then, since the dispatcher 130 only runs the dispatch process, the capacity required in the dispatcher stack can be minimized (for example, it is conceivable that the impact on the memory 020 would be rather small compared to the memory capacity used by the OS 100 and the processes 200*a* through 200*f*).

This will be described in detail below.

When the processor 0 (010*a*) uses the dispatcher stack 131*a* and the processor 1 (010*b*) uses the dispatcher stack 131*b*, the context switch from the current process to the next process can be divided into the two processes of a current process context save and a next process context restore. This is because the dispatcher 130 can run processes using the current process dispatcher stack after the current process context has been saved until the next process context is restored.

The dispatcher 130 runs the dispatch process until completion each time, and does not stop partway through to run a different process, so that there is no need for the dispatcher 130 to save context to the dispatcher stack. The dispatcher 130 starts to use its own stack from a prescribed location in the stack (typically at the head of the stack) each time.

Figure 10:
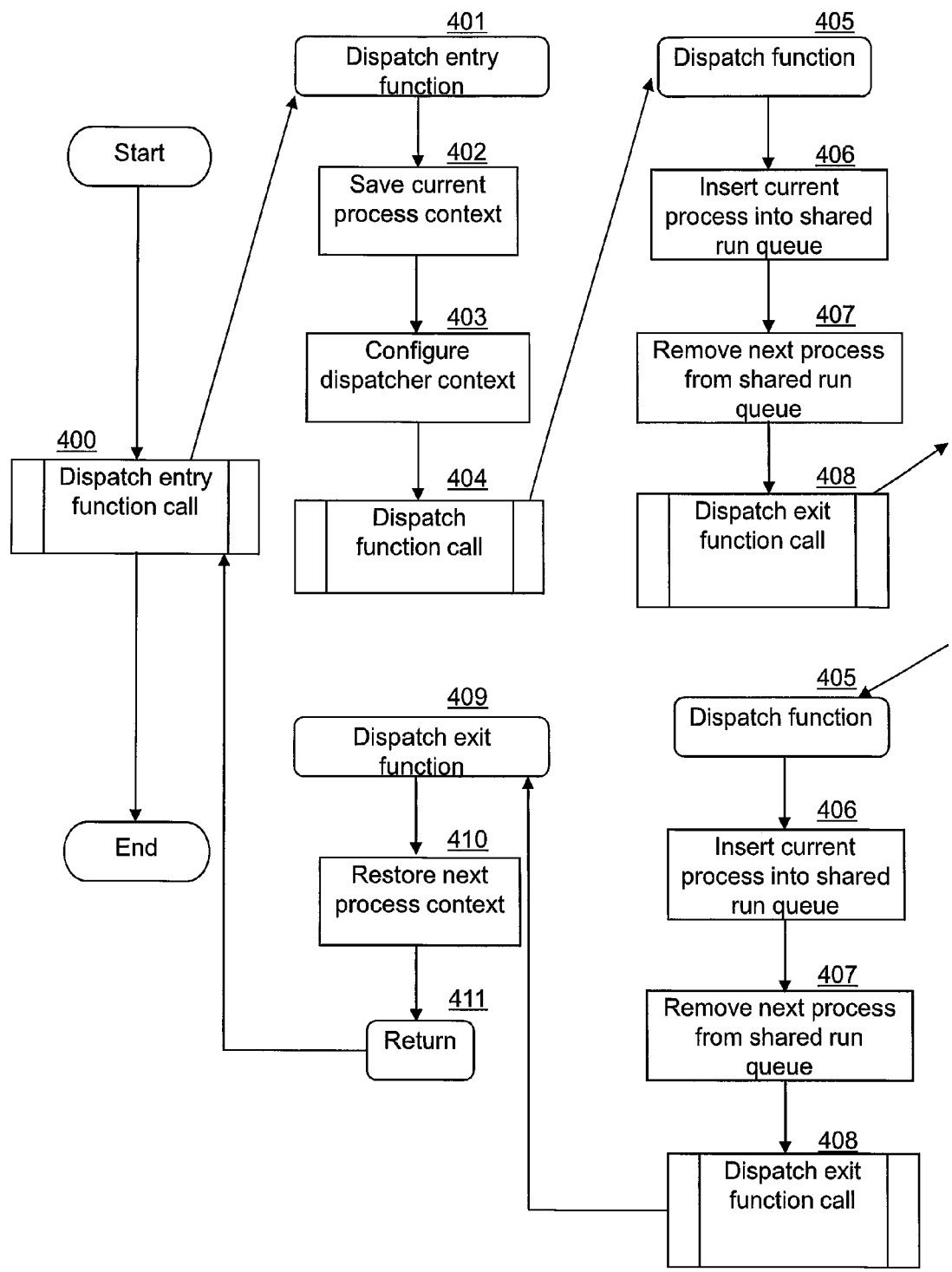
FIG. 10 is the flow of execution of the dispatch process related to the embodiment.

FIG. 10 represents the flow of execution of the dispatch process related to the embodiment. FIGS. 11 through 14 show the flow of dispatch processing related to the embodiment.

In the embodiment, the dispatch process of the dispatcher 130 is realized by three functions: a dispatch entry function 401; a dispatch function 405; and a dispatch exit function 409.

Figure 11:
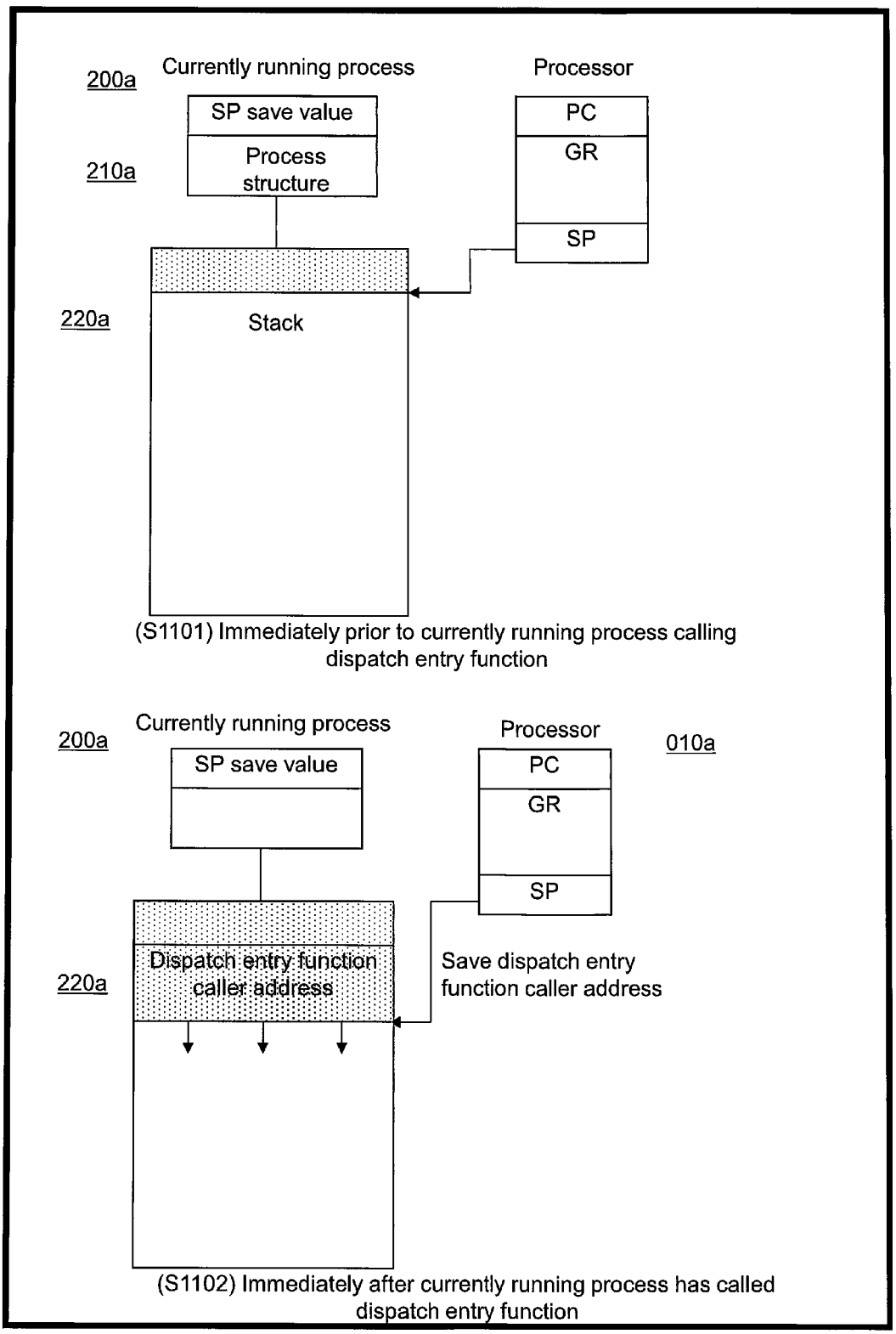
FIG. 11 is a first portion of a conceptual drawing showing the flow of dispatch processing related to the embodiment.

S1101 in FIG. 11: This shows the state prior to the process 200*a* currently running on the processor 010*a* calling the dispatch entry function 401.

S1102 in FIG. 11: When the process 200*a* currently running of the processor 010*a* calls the dispatch entry function 401 (400 in FIG. 10), the caller address of the dispatch entry function 401 is saved to the stack 220*a* of the current process 200*a*. The dispatch entry function 401 saves the context of the current process 200*a* (402 in FIG. 10).

Figure 12:
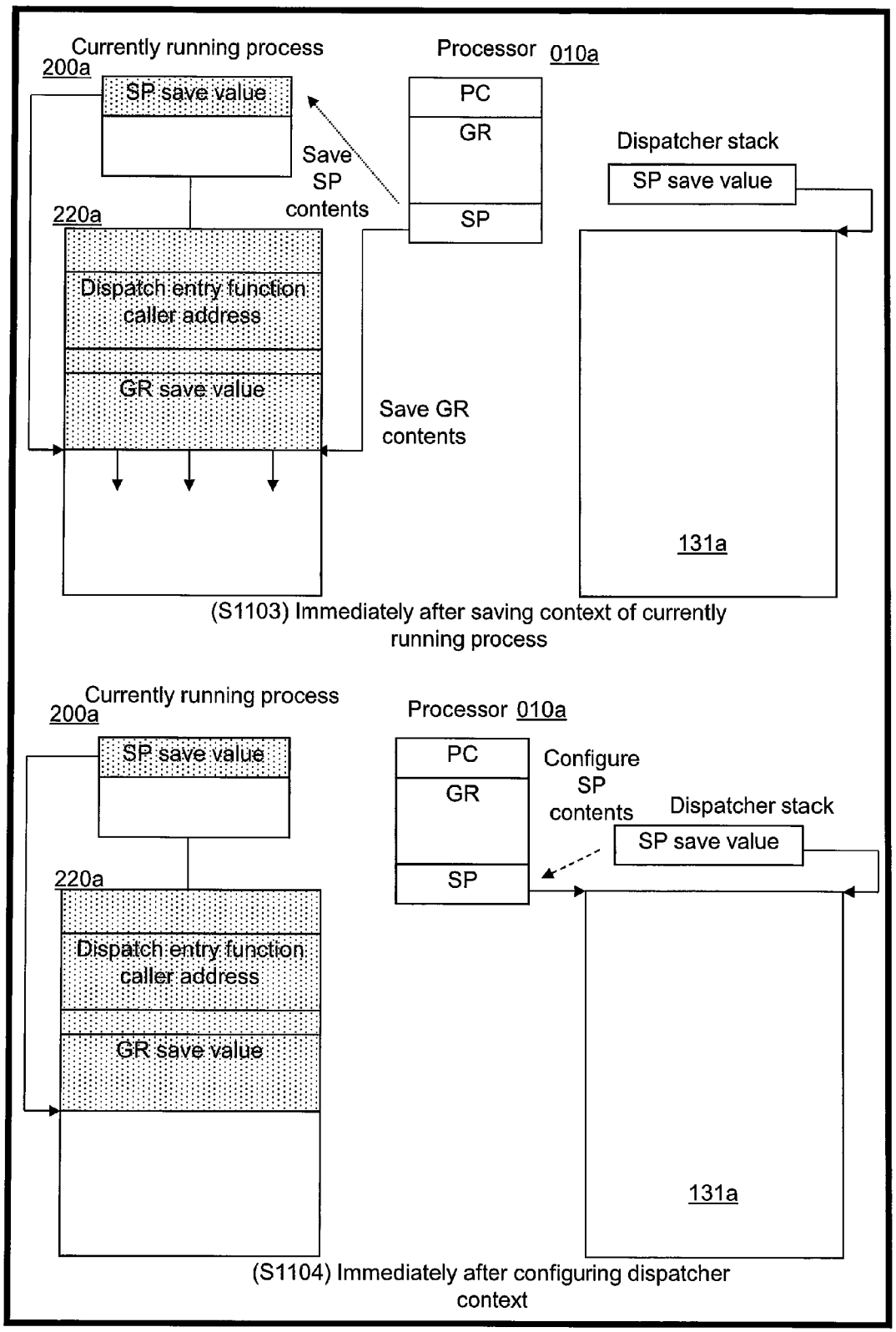
FIG. 12 is a second portion of the conceptual drawing showing the flow of dispatch processing related to the embodiment.

S1103 in FIG. 12: In the context save, first, the dispatch entry function 401 saves the contents of the general register 012*a* in the current processor 010*a* to the stack 220*a* of the current process 200*a*. Then, the dispatch entry function 401 saves the contents of the stack pointer 013*a* of the current processor 010*a* to the SP save value 213*a* of the process structure 210*a* of the current process 200*a*.

S1104 in FIG. 12: After that, the dispatch entry function 401 configures the top of the dispatcher stack 131*a* of the current processor 010*a* in the stack pointer 013*a* of the current processor 010*a*, and switches the stack to the dispatcher stack 131*a* of the current processor 010*a*. In addition, the dispatch entry function 401 also changes the general register 012*a* to the appropriate contents for calling the dispatch function 405, and saves the dispatcher context, such as the addresses of the dispatch function and dispatch exit function, and/or the arguments used when calling these functions in the dispatcher stack 131*a* (403 in FIG. 10). Then, the dispatch entry function 401 uses the dispatch context to call the dispatch function 405 (404 in FIG. 10).

Figure 13:
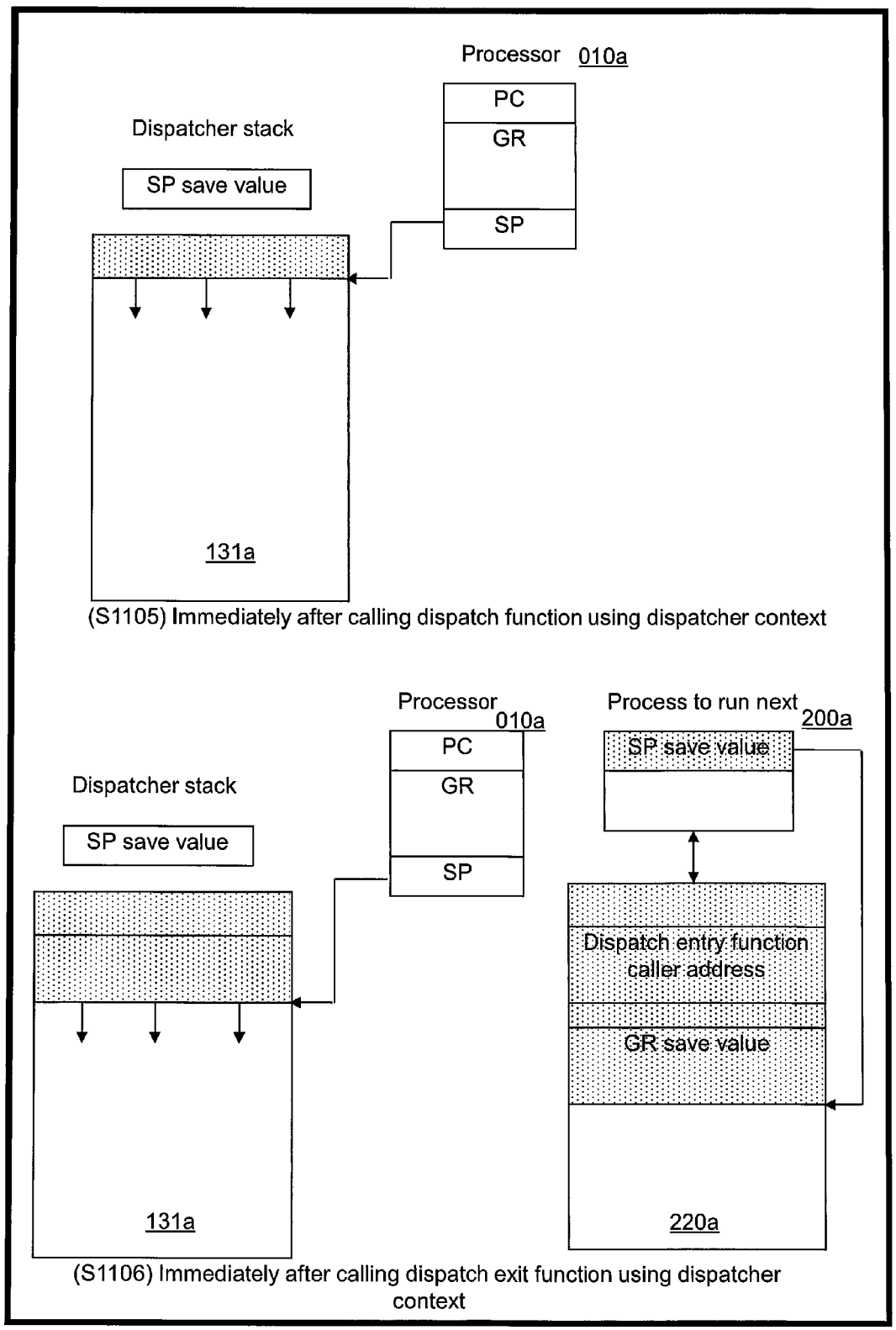
FIG. 13 is a third portion of the conceptual drawing showing the flow of dispatch processing related to the embodiment.

S1105 in FIG. 13: It is not necessary to save the caller address of the dispatch function 405 to the dispatcher stack because the dispatch function 405 does not return to its own caller function. The dispatch function 405, when called, inserts the current process 200*a* into the shared run queue 121 (406 in FIG. 10). The process insertion location is decided by the scheduler 120. The dispatch function 405 fetches the process to run next from the head of the shared run queue 121 (407 in FIG. 10). The dispatch function 405 calls the dispatch exit function 409 (408 in FIG. 10), and restores the context of the process to run next. The calling of the dispatch exit function 409 is performed using the dispatcher context saved in the dispatcher stack 131*a*.

Thereafter, the aforementioned current process 200*a* is fetched from the head of the shared run queue 121 and becomes the process to run next, and the dispatch exit function 409 is called.

S1106 in FIG. 13: It is also not necessary to save the caller address of the dispatch exit function 409 to the dispatcher stack because the dispatch exit function 409 does not return to its own caller.

S1107 in FIG. 14: The dispatch exit function 409, when called, restores the context of the process 200*a* to run next (410 in FIG. 10). In the context restore, first the dispatch exit function 409 restores the stack pointer content 213*a* saved in the process structure 210*a* to the stack pointer 013*a* of the current processor 010*a*. After that, the dispatch exit function 409 restores the general register contents saved in the stack 220*a* of the next process 200*a* to the general register 012*a* of the current processor 010*a*. Then, the dispatch exit function 409 returns to the caller of the dispatch entry function saved in the stack of the process to run next (411 in FIG. 10).

S1108 in FIG. 14: The process to run next resumes running when the dispatch exit function 409 returns to the dispatch entry function caller.

The fact that deadlock does not occur in the embodiment will be explained by referring to FIG. 15.

Figure 15:
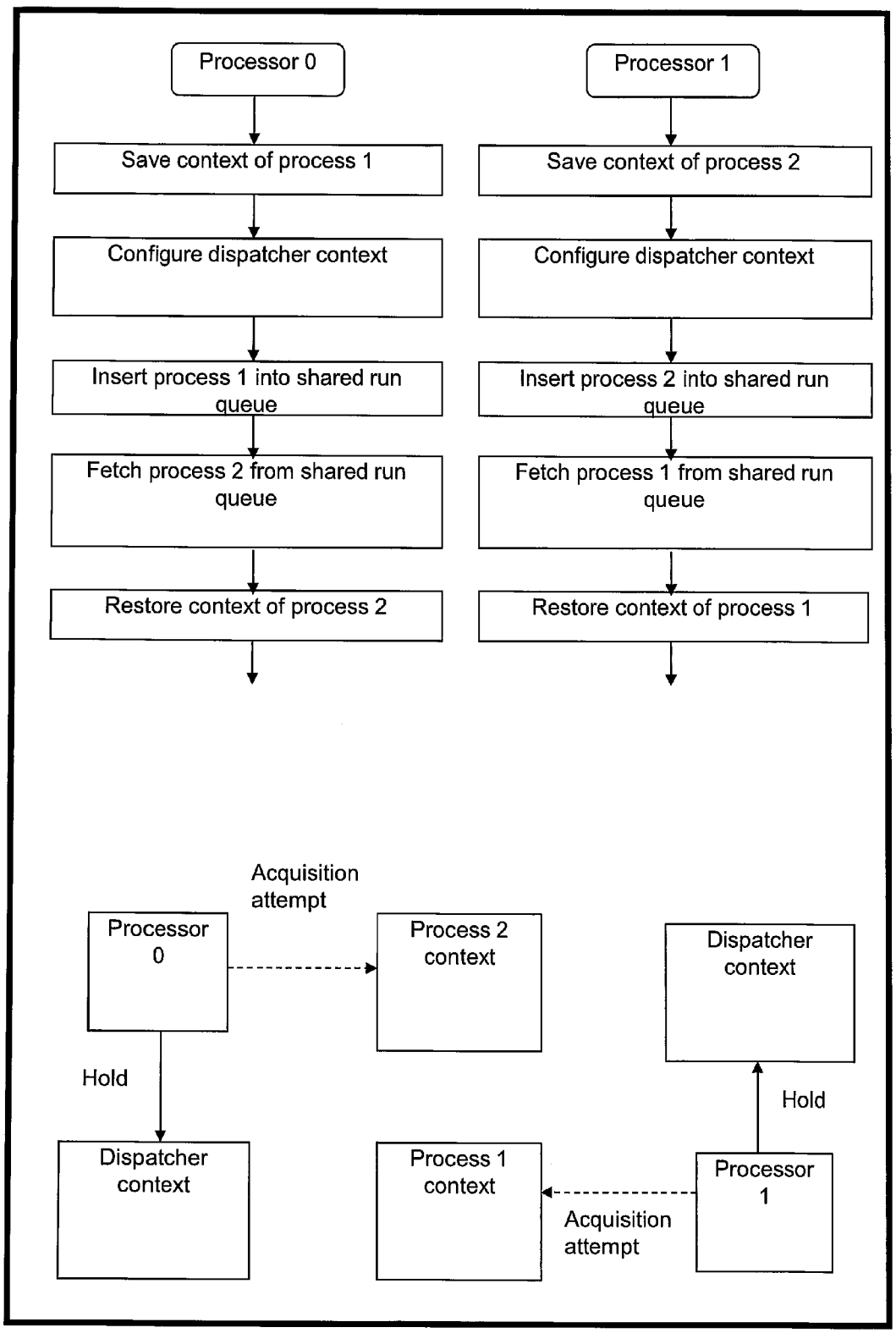
FIG. 15 is a conceptual drawing showing that deadlock does not occur in dispatch processing related to the embodiment.

As shown in the upper part of FIG. 15, it is supposed that the process 1 (200*a*) is running on the processor 0 (010*a*), and the process 2 (200*b*) is running on the processor 1 (010*b*).

When the process 1 (200*a*) running on the processor 0 (010*a*) calls the dispatcher 130, the dispatcher 130 inserts the process 1 (200*a*) into the shared run queue 121 after saving the context of the process 1 (200*a*).

When the process 2 (200*b*) running on the processor 1 (010*b*) calls the dispatcher 130, the dispatcher 130 inserts the process 2 (200*b*) into the shared run queue 121 after saving the context of the process 2 (200*b*).

The scheduler 120 inserts the process 2 (200*b*) into the head of the shared run queue 121, and inserts the process 1 (200*a*) next thereto.

When the dispatcher 130 on the processor 0 (010a) fetches the process 2 (200b) from the head of the shared run queue 121, the process 2 (200b) context is immediately restored and the process 2 (200b) resumes running.

Next, when the dispatcher 130 on the processor 0 (010a) fetches the process 1 (200a) from the head of the shared run queue 121, the process 1 (200a) context is immediately restored and the process 1 (200a) resumes running.

As described hereinabove, according to the embodiment, deadlock does not occur.

The reason deadlock does not occur will be explained in further detail.

On the processor 0 (010a), the dispatcher 130 inserts the process 1 (200a), which called it itself, into the shared run queue 121 after saving the context of the process 1 (200a). Therefore, when the dispatcher 130 running on the processor 1 (010b) removes the process 1 (200a) from the shared run queue 121 and selects the process to run next, the completion of the process 1 (200a) context save is guaranteed.

Consequently, when the dispatcher 130 starts the process 1 (200a) context restore, there is no waiting for the context save for the process 1 (200a) to be completed. In the process context save and restore of the dispatch process, since there is no waiting for the process 1 (200a) context save to be completed, a waiting state cycle resulting from a plurality of processors does not occur. Accordingly, deadlock does not occur.

The same as was explained hereinabove, the reason deadlock does not occur can be explained as follows when the process context and the dispatcher context are thought of as resources to be shared by a plurality of processors, a context restore is regarded as a context acquire by the processors, the running of either a process or the dispatcher on a processor is regarded as a context hold by the processors, and a context save is regarded as a context release by the processors.

That is, as shown in the bottom part of FIG. 15, the processor 0 (010a) attempts to acquire the process 2 (200b) context that is being released while holding its own dispatcher context, and the processor 1 (010b) attempts to acquire the process 1 (200a) context that is being released while holding its own dispatcher context. Thus, there is no wait cycle, and as such, deadlock does not occur.

According to the embodiment, a dispatcher stack is provided for each processor, and the context switch from the currently running process to the process to run next can be divided into a context save process for the process currently running and a context restore process for the process to run next by using the dispatcher stacks. Then, the dispatch process can be performed using a procedure via which the context of the currently running process is saved and the process is inserted into the shared run queue, the process to run next is removed from the shared run queue and the context of the process is restored. The embodiment makes it possible to avoid deadlock without giving rise to overhead resulting from competition among a plurality of processors with respect to process context save and restore.

An embodiment has been explained hereinabove, but the present invention is not limited to the embodiment. For example, the above-described embodiment can be applied to a computer on which a virtual computer mechanism like a hypervisor can run. In this case, the functions of the above-described OS 100 may be applied to the hypervisor or other such virtual computer mechanism, and a process may be applied to a virtual processor (a virtual processor based on one or more processors 010) of a virtual computer.

What is claimed is:

1. A computer, comprising:
a plurality of processors sharing a run queue, which is a process queue; and
a memory in which a process stack is configured,
wherein a plurality of dispatcher stacks, which are data structures, corresponding to the plurality of processors respectively are configured in the memory,
wherein each processor is configured to, prior to releasing a held stack, acquire another stack not held by any other processor and release the held stack thereafter,
wherein, each processor is configured to, in a dispatch process for switching the process that is running,
(A) save a context of a switching-source process, which is the process that is running, to a stack held by the switching-source process,
(B) acquire a dispatcher stack corresponding to the processor, release the switching-source process stack, and save a dispatcher context to the acquired dispatcher stack,
(C) insert the switching-source process in the run queue,
(D) remove a switching-destination process from the run queue, and
(E) acquire a stack held by the switching-destination process, release the dispatcher stack that is being held, and restore a switching-destination process context from the stack acquired from the switching-destination process,
wherein the dispatch process includes a dispatch entry process that includes (A) and (B) processes, a dispatch main process that includes (C) and (D) processes, and a dispatch exit process that includes an (E) process,
wherein the dispatch entry process includes a process for saving the dispatch entry process caller information, and a process for calling the dispatch main process,
wherein the dispatch main process further includes a process for calling the dispatch exit process, and
wherein the dispatch exit process further includes a process for returning to the dispatch entry process caller shown by the caller information saved by the dispatch entry process.

2. The computer according to claim 1,
wherein the dispatch entry process requires that the dispatch entry process caller information be saved, and
wherein the dispatch main process and the dispatch exit process do not require that the respective caller information be saved.

3. The computer according to claim 2,
wherein the dispatcher context includes information used to call the dispatch main process and the dispatch exit process.

4. The computer according to claim 1,
wherein each processor has a stack pointer, which is information indicating the last-referenced location in a stack, and when transitioning from the (A) process to the (B) process, the stack pointer is updated to information indicating a prescribed location in the dispatcher stack corresponding to the processor.

5. The computer according to claim 1,
wherein the context of the switching-source process that is saved includes a general register and a stack pointer.

6. The computer according to claim 1,
further comprising a dispatcher,
wherein the dispatcher stack corresponding to the processor is acquired when the processor calls a dispatch function of the dispatch process, which is executed by the dispatcher.

7. A process dispatch processing method, in a dispatch process for switching a process that is running, using a run queue which is a process queue and shared by a plurality of processors, each of which is configured to, prior to releasing a held stack, acquire another stack not held by any other processor and release the held stack thereafter, the method comprising:
- (A) saving a context of a switching-source process, which is the process that is running, in a stack held by a target processor, which is the processor on which the switching-source process is running;
- (B) acquiring a target processor dispatcher stack, releasing the switching-source process stack from the target processor, and saving in the acquired dispatcher stack a dispatcher context for the target processor, wherein a plurality of dispatcher stacks, which are data structures, correspond to the plurality of processors respectively;
- (C) inserting the switching-source process into the run queue;
- (D) removing a switching-destination process from the run queue; and
- (E) acquiring a stack held by the switching-destination process for the target processor, releasing the held dispatcher stack from the target processor, and restoring in the target processor a switching-destination process context from the stack acquired from the switching-destination process, wherein the dispatch process includes a dispatch entry process that includes (A) and (B) processes, a dispatch main process that includes (C) and (D) processes, and a dispatch exit process that includes an (E) process, wherein the dispatch entry process includes a process for saving the dispatch entry process caller information, and a process for calling the dispatch main process, wherein the dispatch main process further includes a process for calling the dispatch exit process, and wherein the dispatch exit process further includes a process for returning to the dispatch entry process caller shown by the caller information saved by the dispatch entry process.

8. The process dispatch processing method according to claim 7,
wherein the dispatch entry process requires that the dispatch entry process caller information be saved, and
wherein the dispatch main process and the dispatch exit process do not require that the respective caller information be saved.

9. The process dispatch processing method according to claim 8,
wherein the dispatcher context includes information used to call the dispatch main process and the dispatch exit process.

10. The process dispatch processing method according to claim 7,
wherein each processor has a stack pointer, which is information indicating the last-referenced location in a stack, and
wherein when transitioning from the (A) process to the (B) process, the running process stack pointer is updated to information indicating a prescribed location in the dispatcher stack corresponding to the processor.

11. The process dispatch processing method according to claim 7,
wherein the context of the switching-source process that is saved includes a general register and a stack pointer.

12. The process dispatch processing method according to claim 7,
wherein the dispatcher stack corresponding to the target processor is acquired when the target processor calls a dispatch function of the dispatch process.

* * * * *